United States Patent
Kubo et al.

(10) Patent No.: US 7,551,205 B2
(45) Date of Patent: Jun. 23, 2009

(54) IMAGE PROCESSING METHOD, IMAGE PROCESSING SYSTEM, IMAGE PROCESSING APPARATUS AND IMAGE PROCESSING PROGRAM

(75) Inventors: Masahiro Kubo, Kanagawa (JP); Hideo Seto, Kanagawa (JP); Hisashi Ohara, Kanagawa (JP); Satoshi Ozawa, Kanagawa (JP); Masayuki Ryuto, Kanagawa (JP); Takayuki Iida, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 864 days.

(21) Appl. No.: 11/083,985

(22) Filed: Mar. 21, 2005

(65) Prior Publication Data

US 2005/0206734 A1    Sep. 22, 2005

(30) Foreign Application Priority Data

Mar. 22, 2004  (JP)  ............................. 2004-083385
Mar. 26, 2004  (JP)  ............................. 2004-093634

(51) Int. Cl.
  *H04N 5/228*  (2006.01)
(52) U.S. Cl. ................................. 348/222.1
(58) Field of Classification Search ............. 348/207.1, 348/222.1
   See application file for complete search history.

(56) References Cited

U.S. PATENT DOCUMENTS

| | | | | |
|---|---|---|---|---|
| 6,356,357 | B1 * | 3/2002 | Anderson et al. | 358/1.17 |
| 2001/0036359 | A1 * | 11/2001 | Nishikawa et al. | 386/109 |
| 2001/0040689 | A1 * | 11/2001 | Uda et al. | 358/1.13 |
| 2003/0063213 | A1 * | 4/2003 | Poplin | 348/362 |
| 2003/0146996 | A1 * | 8/2003 | Ide | 348/323 |
| 2004/0046880 | A1 * | 3/2004 | Kawakubo | 348/272 |
| 2004/0109186 | A1 * | 6/2004 | Shindoh et al. | 358/1.13 |
| 2004/0233466 | A1 * | 11/2004 | Shindoh et al. | 358/1.13 |
| 2005/0012826 | A1 * | 1/2005 | Hattori et al. | 348/220.1 |

* cited by examiner

*Primary Examiner*—James M Hannett
(74) *Attorney, Agent, or Firm*—Sughrue Mion, PLLC

(57) ABSTRACT

Raw image data obtained by shooting is thinned at a thinning rate, which is determined in accordance with a shooting scene, to produce simple raw image data. The thinning rate is determined such that necessary information for proper checking is maintained and unnecessary information for checking is thinned. Image correction is performed for the simple raw image data with predetermined processing parameters, and this data is converted into a simple display image to be shown on a monitor. An operator observes the simple display image to change the processing parameters. Whenever the processing parameters are changed, the image correction is performed for the simple raw image data with the changed processing parameters to update the simple display image. For the raw image data, image correction is performed with the finally determined processing parameters.

14 Claims, 13 Drawing Sheets

<PRODUCING PROCESS FOR SIMPLE RAW IMAGE DATA>

| SHOOTING SCENE | THINNING RATE | |
|---|---|---|
| PERSON | PERSON AREA | : LOW |
| | EXCEPT PERSON AREA | : HIGH |
| SCENERY | ENTIRE AREA | : EVENNESS |
| BUILDING | MAIN SUBJECT AREA | : LOW |
| | EXCEPT MAIN SUBJECT AREA | : HIGH |
| THE OTHERS | HIGH FREQUENCY AREA | : LOW |
| | LOW FREQUENCY AREA | : HIGH |

<PRODUCING PROCESS FOR SIMPLE RAW IMAGE DATA>

| USES OF SIMPLE DISPLAY IMAGE | THINNING RATE |
|---|---|
| IMAGE TO BE CHECKED | SMALL THINNING RATE |
| PRESENTATION IMAGE | MIDDLE THINNING RATE |
| THUMBNAIL IMAGE | LARGE THINNING RATE |

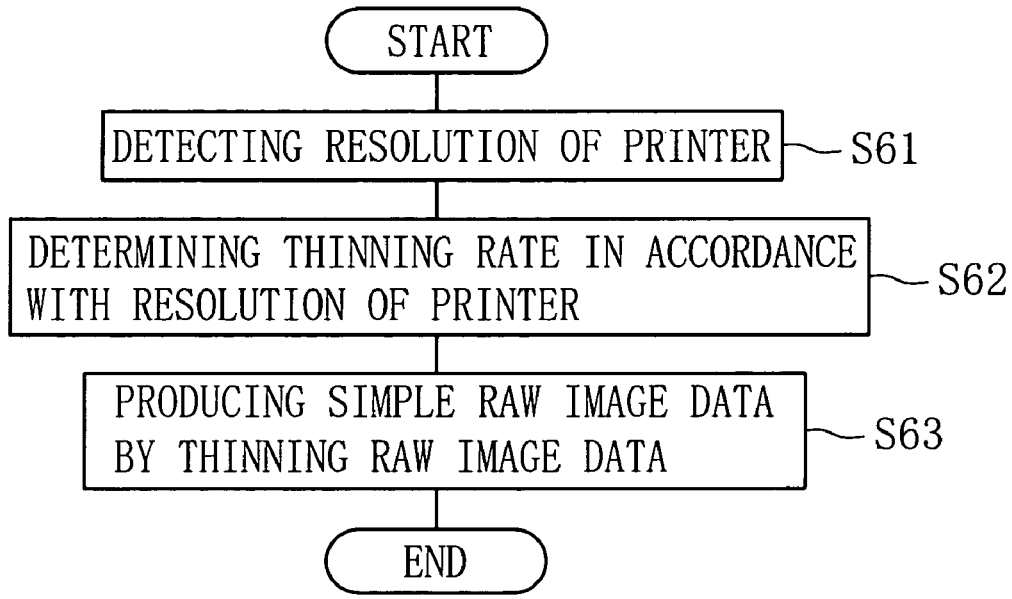
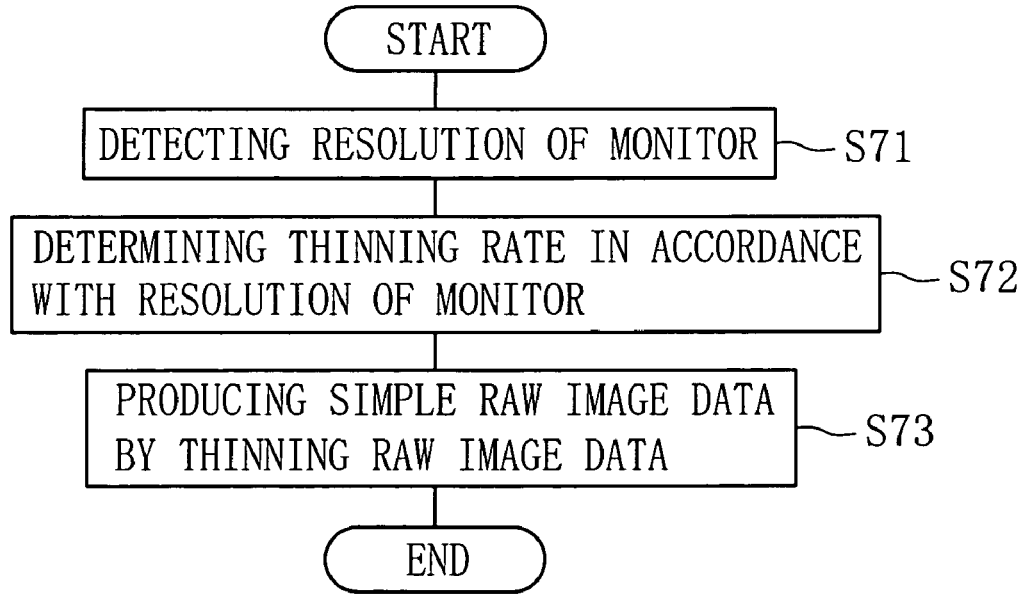

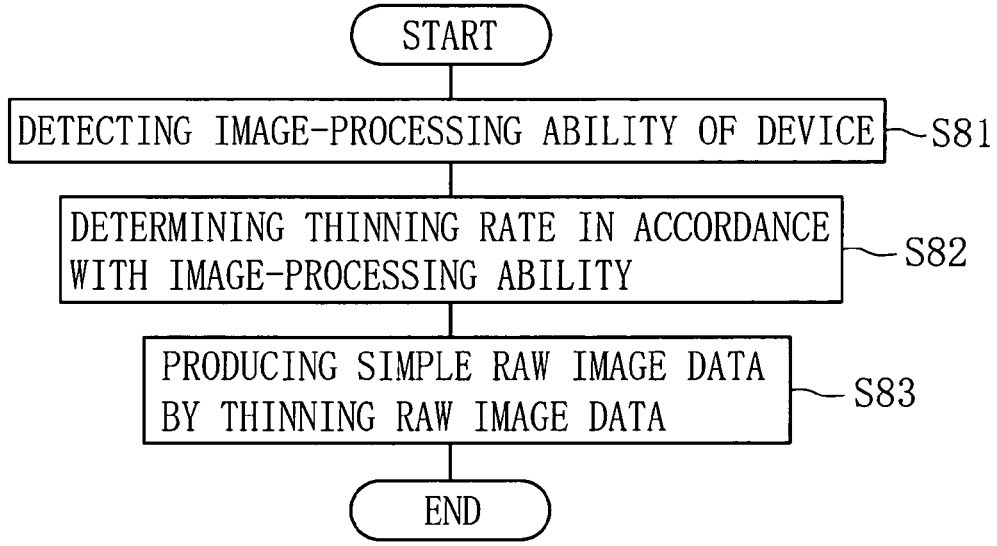
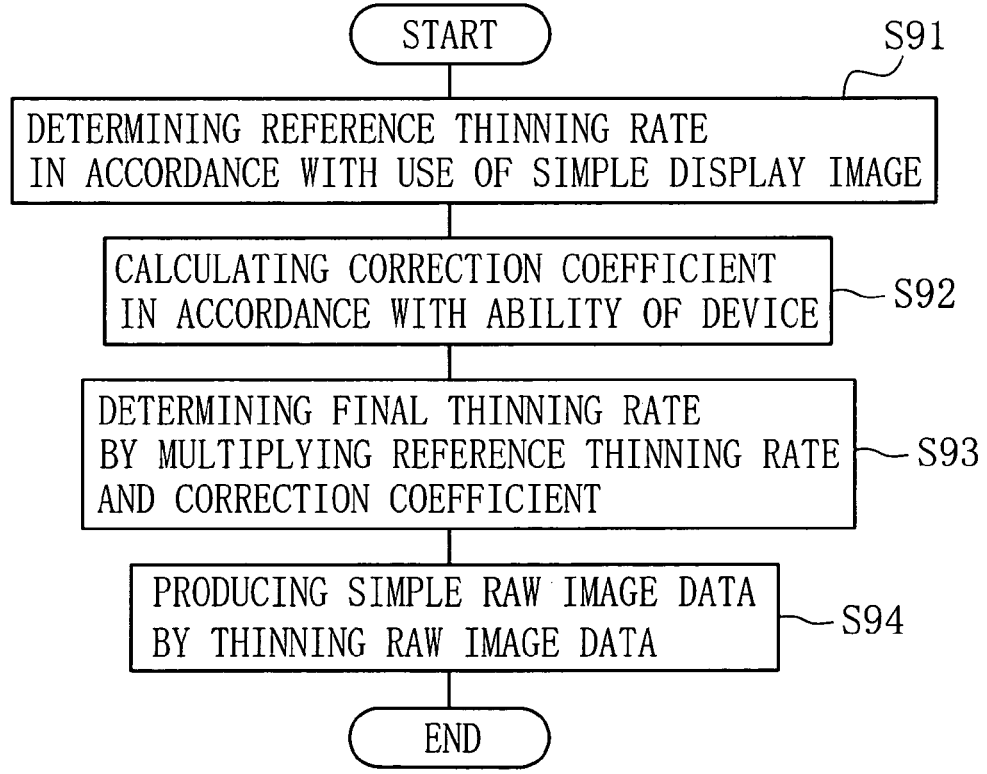

IMAGE PROCESSING METHOD, IMAGE PROCESSING SYSTEM, IMAGE PROCESSING APPARATUS AND IMAGE PROCESSING PROGRAM

BACKGROUND OF THE INVENTION

1. Field of the Invention

The present invention relates to an image processing method, an image processing system, an image processing apparatus and an image processing program, in which various image processes are performed while digital image is reproduced on the basis of raw image data (CCD-raw data) transferred from an imaging device of an electronic camera and so forth.

2. Description of the Related Art

In order to improve quality of a digital image, it is effective to correct color balance, white balance and a torn curve of the digital image by using an information processing equipment of a personal computer (PC) and so forth. For example, when a picture is taken with an electronic camera, image data is transferred from the electronic camera to the PC. An operator observes an image displayed on a monitor connected to the PC, and performs a checking operation in which various correction parameters are altered to obtain an image having a desired finish.

The electronic camera outputs raw image data (raw data) for which white-balance processing and exposure correction are not yet executed. By using the electronic camera, it is possible to perform image checking in the PC without deteriorating color information in the electronic camera.

The raw image data is raw data outputted from an imaging device of the electronic camera. In order to display the image on the monitor of the PC, it is necessary to perform correction of the image on the basis of parameters (hereinafter processing parameters) of the white-balance correction and the exposure correction. Further, it is necessary to perform processing, namely to convert the raw image date into processed image data having TIFF (Tagged Image File Format) style, for example. However, since the raw image data includes pixel data of each color, which represents tone value of twelve bits or sixteen bits for instance, a data size is extremely large so that it takes a long time for the processing procedure. In addition, whenever various processing parameters are changed, the processing procedure is performed again with the changed parameters. Thus, when the raw image data has a large size, there arises a problem in that it takes a considerable time for the checking operation. Further, since load of a CPU is great during the processing procedure, there arises another problem in that it is impossible to perform the other procedure while the processing procedure is performed again after changing the various processing parameters.

In a conventional checking operation, an operator selects the image to be checked one by one and changes processing parameters every image. Thus, when the raw image data having a large data size is processed, it is likely to take a long time for completing the checking operation. In particular, when image pickup conditions are substantially identical regarding a plurality of taken images, such as shooting performed in a studio, the optimum processing parameters are substantially identical. Regardless of the identical parameters, the operator checks the images one by one. This checking operation is inefficient.

Further, besides the above processing parameters, image-adjusting parameters concerning color correction and trimming are simultaneously amended as well. In the conventional checking operation, whenever the image-adjusting parameters are changed, the image adjustment is performed in addition to the processing procedure. Consequently, there arises a problem in that it takes further time for the checking operation.

In order to deal with the above problems, it is considered that reduced image data, which is produced by compressing the raw image data in JPEG (Joint Photographic Experts Group) format for example, is used for the checking operation. However, the reduced image data has different color space and different bit in comparison with the processed image data obtained by processing the raw image data. Thus, an image of the JPEG format has different tone relative to a display image so that the proper checking operation is likely to be disturbed.

Meanwhile, in a case that a picture is taken with the electronic camera in a photo studio or the like, image data is transferred from the electronic camera to a checking PC and a PC for presentation. An image is displayed on the PC for presentation after shooting to show an approximate finish state of the taken image. A user of the photo studio observes the displayed image to order printing of the necessary images and to request image correction for changing image brightness, colors and so forth. An operator performs a checking operation, in which various correction parameters are altered, on the checking PC to obtain the image having a desired finish.

Also in this case, due to the same reason described above, there arises a problem in that it takes a considerable time for the checking operation when the raw image data has a large size. Moreover, there arises another problem in that it takes time for processing procedure so that smooth presentation is disturbed while the user observes the image.

SUMMARY OF THE INVENTION

In view of the foregoing, it is a primary object of the present invention to provide a method, a system, an apparatus and a program for processing an image, in which raw image data is utilized to perform a proper checking operation, and a time to be required for the checking operation is shortened.

It is a second object of the present invention to provide a method and a program for processing an image, in which a time to be required for a checking operation and presentation is shortened, and an optimum image is outputted in accordance with uses and devices of checking and presentation.

In order to achieve the above and other objects, in the present invention, a thinning rate for thinning the raw image data is determined regarding at least one of areas of the image on the basis of a shooting scene. Simple raw image data is produced by thinning the raw image data at the determined thinning rate. For the simple raw image data, image correction is performed with first correction parameters regarding white balance and exposure correction. A simple display image produced based on the corrected simple raw image data is reproduced to adjust the first correction parameters. And then, image correction is performed for the raw image data on the basis of the adjusted first correction parameters.

It is preferable that the thinning rate is determined for the respective areas the image. In a case there are the first area of a high thinning rate and the second area of a low thinning rate within the image, it is preferable that interpolation is performed with pixel data of the thinned first area to make pixel density of the first area equal to that of the second area. Moreover, it is preferable that the thinning rate is determined on the basis of a reduced image, which is obtained by reducing a size of the image in an electronic camera. Further, it is preferable that the reduced image corresponding to the uncorrected image is displayed in black and white.

Whenever the first correction parameters are changed, image correction is performed for the simple raw image data with the changed first correction parameters to display the corrected simple raw image data. After adjusting the first correction parameters, image adjustment is performed for the simple display image with second correction parameters regarding color adjustment and trimming, for instance. And then, image adjustment is performed for the raw image data with the determined second correction parameters.

When image processing is performed for the images taken under identical image pickup conditions, it is preferable to perform image correction in a lump with the same correction parameters. In this case, the simple raw image data is produced for the image of the first frame to adjust the first correction parameters, and image correction is performed for the raw image data corresponding to the images of the second and succeeding frames, with the determined first correction parameters. Meanwhile, the simple raw image data may be produced for one of the images to adjust the first correction parameters, and the image correction may be performed for the raw image data corresponding to the selected other image of the images with the determined first correction parameters.

The image processing system comprises an electronic camera for producing the raw image data by shooting a subject, and an image converting device for performing image correction for the raw image data. In either of the electronic camera and the image converting device, the simple raw image data is produced by thinning the raw image data at the thinning rate changed in accordance with the shooting scene. In the image converting device, the image correction is performed for the simple raw image data with the first correction parameters. In addition, the simple display image produced based on the corrected simple raw image data is displayed to adjust the first correction parameters. And then, image correction is performed for the raw image data on the basis of the adjusted first correction parameters.

According to the present invention, the thinning rate is determined on the basis of the shooting scene and the simple raw image data is produced by thinning the raw image data at the determined thinning rate so that color space and bits of the simple raw image data are identical with that of processed image data to be obtained by processing the raw image data. Thus, mistaken recognition of color may be prevented, and proper checking operation may be carried out. Moreover, the first correction parameters are adjusted by using the simple raw image data having a small data size so that a period to be required for the image processing may be shortened.

Since the reduced image corresponding to the uncorrected image is displayed in black and white, the operator is prevented from observing the reduced image having different color space and different display color. Consequently, the operator is prevented from mistakenly recognizing the color.

Moreover, according to the present invention, a period for processing the image may be effectively shortened. Moreover, the image processing may be efficiently performed.

In another embodiment of the present invention, the image processing method comprises a step of producing simple raw image data by thinning raw image data at a variable thinning rate. Image correction is performed for the simple raw image data with correction parameters, and simple display image is displayed based on the corrected simple raw image data. The correction parameters are adjusted on the simple display image, and image correction is performed for the raw image data with the adjusted correction parameters.

In this embodiment, the image processing program makes a computer work as an image producer, a thinning-rate changer, an image corrector and a driver. The image producer produces the simple raw image data by thinning the raw image data obtained by shooting. The thinning-rate changer varies the thinning rate when the raw image data is thinned. The image corrector performs image correction for the simple raw image data with correction parameters. The driver shows a simple display image based on the corrected simple raw image data, on a display.

It is preferable that the thinning rate is determined on the basis of the following factors:
 (1) Uses of the simple display image, for instance, image correction, presentation and printing;
 (2) A monitor size of a device for displaying the simple display image;
 (3) Resolution of a printer for printing the simple display image;
 (4) Processing ability of a device for performing the image correction;
 (5) Processing ability of a device for performing the presentation of the image; and
 (6) Combination of two or more factors selected from among the above (1) to (5).

According to the present invention, checking and presentation are performed by using the simple raw image data, which is produced by thinning the raw image data and has a smaller data size. Thus, it is possible to shorten a period to be required for the checking and the presentation. The thinning rate is changed in accordance with the uses of the checking and the presentation, the ability of the devices for displaying and processing the image, and the resolution of the printer for outputting the image. Thus, it is possible not only to effectively shorten the period to be required for processing, but also to output the optimum image in accordance with the ability of the devices.

BRIEF DESCRIPTION OF THE DRAWINGS

The above objects and advantages of the present invention will become apparent from the following detailed description of the preferred embodiments of the invention when read in conjunction with the accompanying drawings, in which:

FIG. 14 is a flowchart showing a sequence for determining the thinning rate in accordance with resolution of a printer;

FIG. 15 is a flowchart showing a sequence for determining the thinning rate in accordance with resolution of a monitor;

FIG. 16 is a flowchart showing a sequence for determining the thinning rate in accordance with image processing ability of a device, which performs checking and presentation; and FIG. 17 is a flowchart showing a sequence for determining the thinning rate by comprehensively judging plural factors.

DETAILED DESCRIPTION OF THE PREFERRED EMBODIMENT(S)

Figure 1:
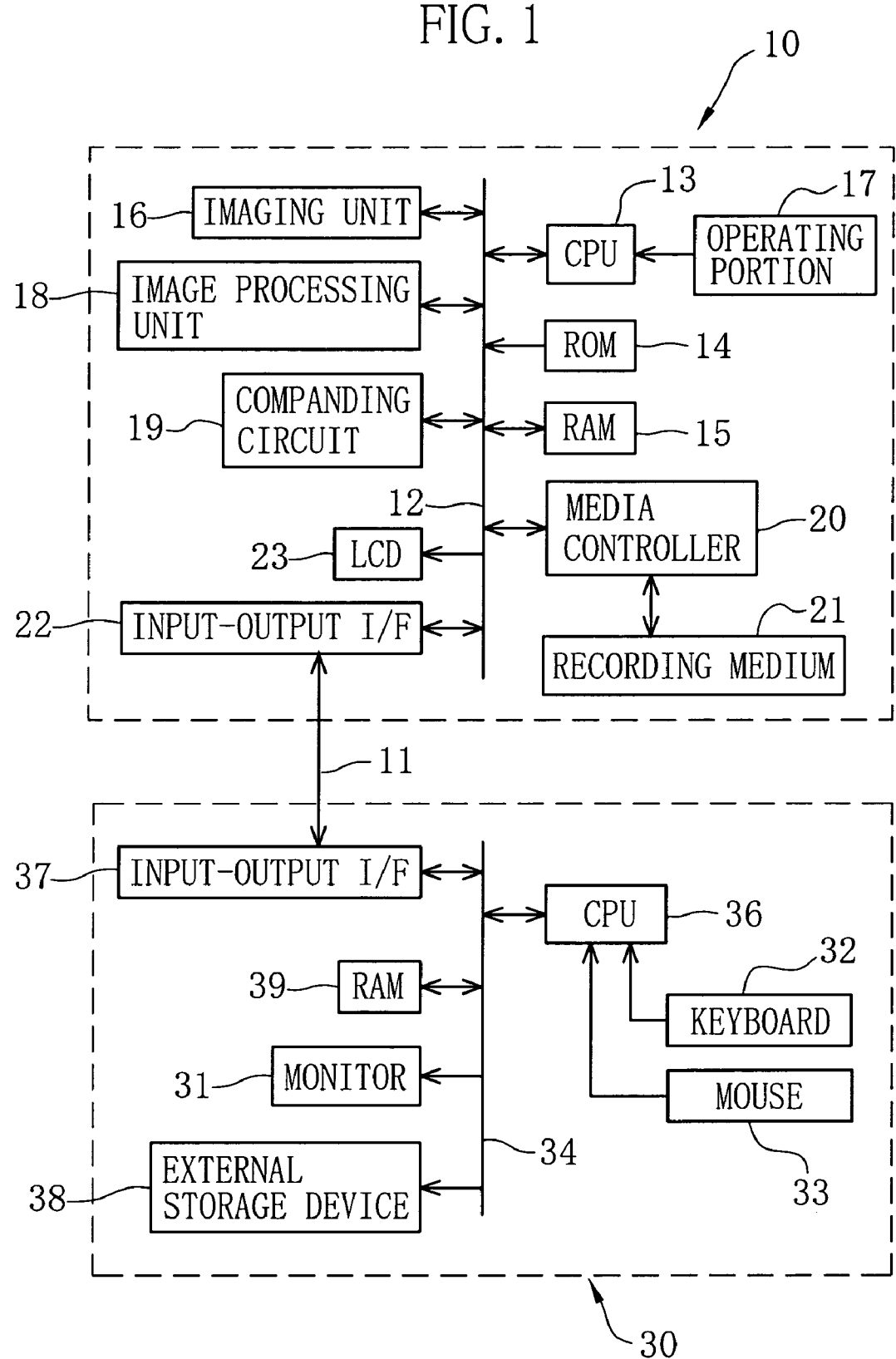
FIG. 1 is a block diagram schematically showing a structure of an electronic camera and an image checking PC.

FIG. 1 is a block diagram showing an imaging system constituted of an electronic camera 10 and an image checking PC 30. It is possible to use a store-bought personal computer, in which an image processing program is installed, as the image checking PC 30. The image processing program is for executing various correction processes for a digital image obtained by shooting. The electronic camera 10 and the image checking PC 30 are connected to each other via a communication cable 11 so as to be capable of transferring control data and image data. The communication cable 11 is compliant with USB (Universal Serial Bus) and IEEE1394, for example. The data may be transferred by using a radio communication tool instead of the communication cable 11.

The respective sections of the electronic camera 10 are connected with each other via a data bus 12, and operations thereof are totally controlled by a CPU 13. A program for operating the electronic camera 10 is stored in a ROM 14 and is loaded into a RAM 15 at the time of starting the electronic camera 10. An imaging unit 16 comprises a well-known taking lens, a CCD and so forth to produce digital image data by photoelectrically converting an optical image of a subject. Image pickup conditions of a stop, a shutter speed and so forth are set by handling various setting buttons provided at an operating portion 17. Alternatively, the image pickup conditions may be determined in the image checking PC 30 and setting information thereof may be sent to the electronic camera 10 via the communication cable 11. Further, another PC for shooting control may be connected to the electronic camera 10.

The image data outputted from the imaging unit 16 is temporarily stored in the RAM 15. The image data is the raw image data (raw data) for which image correction of white-balance processing and so forth is not yet performed. For example, the image data of the respective colors is constituted of pixel data of 4256×2848 pixels having a gradation value represented by 16 bits. An image processing circuit 18 reduces the gradation value of the raw image data to 8 bits. In addition, the image processing circuit 18 performs the white balance processing, the gradation conversion processing and so forth on preset conditions to output the corrected image data. A companding circuit 19 compresses the corrected image data in conformity with a format defined by JPEG to output the compressed image data. Further, the corrected image data is thinned to produce the JPEG image data (reduced-image data) of 603×402 pixels, for instance. In this embodiment, the reduced-image data compressed in conformity with the JPEG format is used for shortening a period to be taken for processing. However, the raw image data may be thinned at a predetermined rate to use this data as the reduced-image data.

The raw image data is transferred, together with the reduced-image data, to the image checking PC 30 via an input-output I/F 22. Alternatively, only the raw image data may be transferred to the image checking PC 30. Meanwhile, an LCD 23 continuously displays a subject image under a capturing mode, and reproduces the image of a recording medium 21 under a reproducing mode. In this embodiment, the raw image data is directly transferred to the image checking PC 30 via the input-output I/F 22. However, the raw image data may be recorded in the recording medium 21. In this case, the recording medium 21 is set to the image checking PC 30 to transfer the raw image data.

On the basis of the raw image data transferred from the electronic camera 10, the image checking PC 30 reproduces the image on a monitor 31. In addition, the image checking PC 30 performs the various image corrections in response to operational signals sent from input devices of a keyboard 32, a mouse 33 and so forth. The respective sections of the image checking PC 30 are connected with each other via a data bus 34, and operations thereof are integrally controlled by the CPU 36. The raw image data transferred from the electronic camera 10 is recorded, together with the corresponding reduced-image data, in an external storage device 38 of a hard disk and so forth via an input-output I/F 37 and the data bus 34. The input devices of the keyboard 32 and the mouse 33 are operated when the image is corrected such as described later and when the image pickup conditions of the electronic camera 10 are set.

The image processing program is installed into a recording medium of a CD-ROM, a DVD-ROM or the like. Alternatively, the image processing program is installed into the external storage device 38 of the image checking PC 30 via the Internet. By operating the keyboard 32 and the mouse 33, the image processing program is retrieved to a RAM 39 and is executed.

Figure 2:
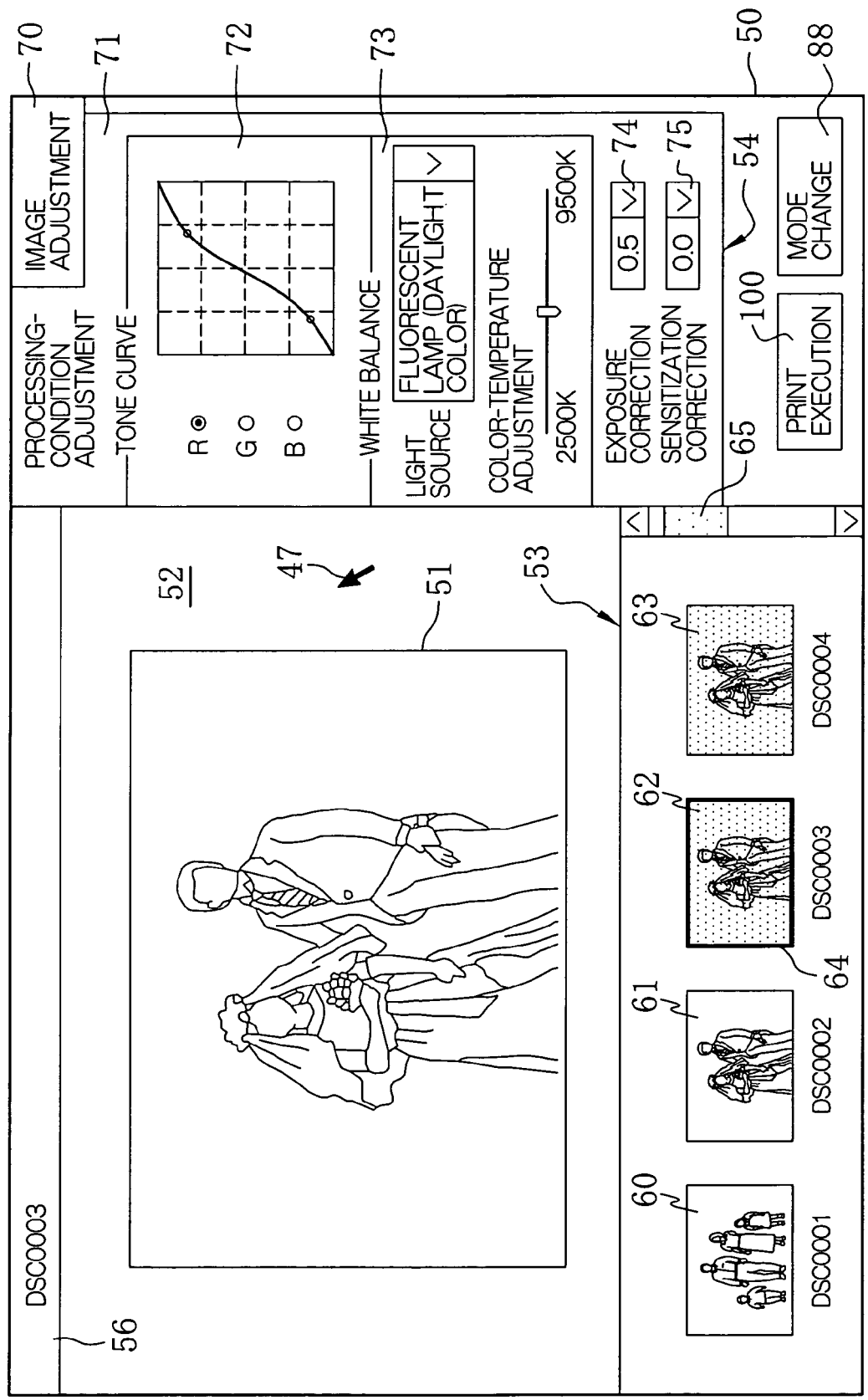
FIG. 2 is an explanatory illustration showing an image checking picture.
Figure 3:
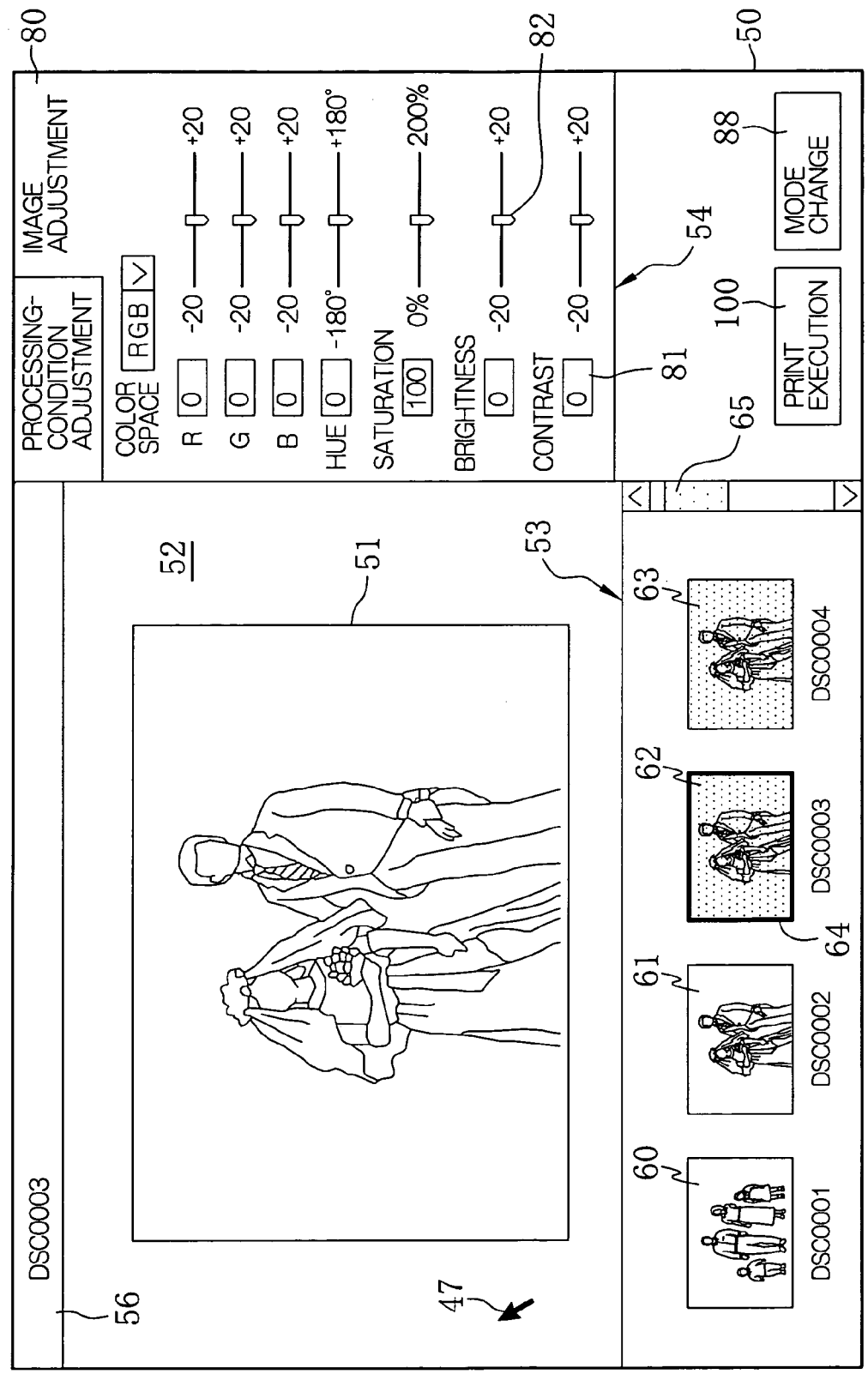
FIG. 3 is an explanatory illustration showing another embodiment of the image checking picture.

Upon running the image processing program, a picture 50 for checking is displayed on the monitor 31 such as shown in FIGS. 2 and 3. The picture 50 is provided with a check-image displaying area 52 where an image to be checked is displayed, a reduced-image displaying area 53 where a plurality of the reduced images are arranged, and a parameter adjusting area 54. A title bar 56 displaying a title (file name) of the image 51 is displayed at an upper side of the check-image displaying area 52.

The image 51 to be checked is based on simple raw image data produced by thinning the raw image data at a thinning rata correlating with a shooting scene, which has been judged on the basis of the corresponding reduced-image data of the JPEG format. A producing process for the simple raw image data is described below with a flowchart shown in FIG. 4.

In association with the execution of the image processing program, the shooting scene is judged, and a subject of the image 51 to be checked is classified to one of four categories of person, scenery, building and the others (S1). The shooting scene is judged by determining a contour and inside color components of the contour on the basis of spatial frequency characteristics of the reduced-image data and color-density gradation value of the respective pixels. A portion having a linear contour is judged as a scene taking a building. With respect to a portion having a curving contour, it is judged from color information of the inside thereof whether scenery is taken or a building is taken. Meanwhile, when the contour is oval and the color information of the inside thereof represents flesh color, it is judged that a person is shot.

The present invention is not restricted by the method for judging the shooting scene. As to the method for judging the shooting scene on the basis of the image data, various methods are known besides the above-mentioned method (for example, Japanese Patent Laid-Open Publication No. 2001-218015). It is possible to judge the shooting scene by adopting such a well-known method. Moreover, in the present embodiment, the shooting scenes are classified into four categories. However, there are infinite patterns for classifying the shooting scenes, and it is possible to freely set this pattern. Further, in the present embodiment, the shooting scene is judged on the basis of the reduced-image data in order to shorten a processing period. However, the shooting scene may be judged by analyzing the raw image data and the other data produced by thinning the raw data at a prescribed rate.

Figures 4, 5:
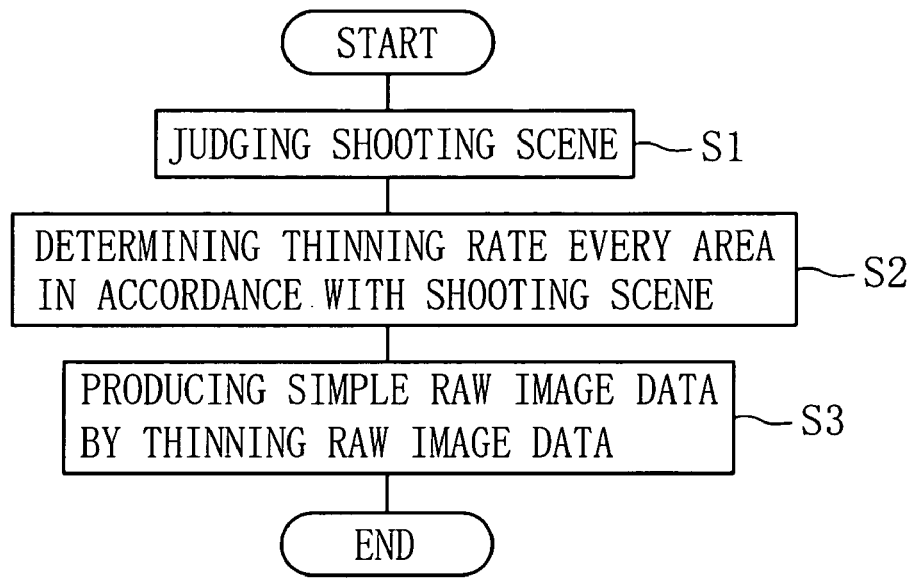
FIG. 4 is a flowchart showing a sequence for producing simple raw image data.
FIG. 5 is an explanatory illustration showing relationship between scooting scenes and thinning rates.

In accordance with a judgment result of the shooting scene, a thinning rate is decided every area of the raw image data (S2). As shown in FIG. 5, the thinning rate is decided such that information is largely thinned relative to the area, which is hardly used for checking, in order to shorten the processing period. By contrast, information of the area necessary for checking is left as much as possible in order to perform the proper checking.

When a person is shot, the information of the person area is necessary for checking. Thus, the person area is thinned at a low thinning rate. The other area, for instance the scenery area, is not important in comparison with the person area, so that the other area is thinned at a high thinning rate. When scenery is shot, the entire area is thinned at a predetermined thinning rate. When a building is shot, an area including the main subject is thinned at a low thinning rate, and the other area is thinned at a high thinning rate. When the other of the above three categories is shot, a high-frequency area is thinned at a low thinning rate, and a low-frequency area is thinned at a high thinning rate.

The high-frequency area means an area where a numerical integration value of high-frequency components of spatial frequency of the image data (reduced-image data in the present embodiment) is a prescribed value or more. Such an area is likely to be obtained when a fine pattern is shot, for example. In contrast, the low-frequency area means an area where a numerical integration value of low-frequency components is a prescribed value or more. This area is likely to be obtained when the sky is shot, for example.

In the present embodiment, the thinning rate is changed every area. However, the entire area may be thinned at a predetermined thinning rate. In this case, the thinning rate is changed in accordance with the scenes of person, scenery and so forth, which are classified by judging the shooting scenes. Incidentally, setting of the areas and the thinning rates of the respective areas are not limited to the above embodiment so that it is possible to freely set them. For example, when a person is shot, setting may be changed so as to especially keep the thinning rate of a face area of the person area at low level.

Further, in the present embodiment, the shooting scene is automatically judged by the image processing program. However, a checker may manually check the shooting scene. In this case, the most appropriate shooting scene is selected from among prepared shooting scenes of person, scenery and so forth, and is inputted by using the mouse 33 and the keyboard 32. Furthermore, in the present embodiment, the thinning rate is automatically decided by the image processing program. However, the thinning rate and the area to be thinned may be selected by using the mouse 33 and the keyboard 32.

Successively, the simple raw image data is produced by thinning the raw image data at the decided thinning rate (S3). At this time, in the case the thinning rate is different every image area (the person, the building and the other in the present embodiment), a number of the pixels remaining after thinning is different every area. Thus, if the simple raw image data is produced by combining the areas as it is, distortion occurs on the image so that an impression of the image becomes different from the raw image data. In order to prevent such a problem, in the case the thinning rate is different every image area at the time of producing the simple raw image data, image interpolation processing is performed so as to conform a pixel density to that of the area thinned at the lowest thinning rate. This processing is performed by replacing a gap, which occurs between the pixels of the area thinned by the higher thinning rate, with the nearby pixel. By the way, in the image interpolation processing, the optimum pixel for replacement may be selected on the basis of the color-density gradation values of the nearby pixels, and the gap may be replaced with this selected pixel.

For the simple raw image data produced in this way, image correction is performed with the initial parameters predetermined by the image processing program. Further, the simple raw image data is outputted to the monitor as simple processed image data converted into Tiff format having 16-bit gradation value, for example. Thereupon, the image 51 to be checked is shown within the check-image displaying area 52. Hereinafter, processing for performing the image correction of the simple raw image data and outputting the simple processed image data is called as "provisional processing". Further, processing for performing the image correction of the raw image data and outputting processed image data is called as "regular processing".

Within the reduced-image displaying area 53, a plurality of reduced images 60 to 63 are displayed side-by-side. Each of the reduced images 60 to 63 is reproduced on the basis of the corresponding reduced-image data of the JPEG format. Although the reduced images of four frames are displayed in FIG. 3, the number of the frames to be simultaneously displayed may be properly increased and decreased. Meanwhile, a selection cursor 64 is highlighted at the surrounding portion of the reduced image 62 corresponding to the image 51 to relate the reduced image 62 to the image 51. At the right side of the reduced-image displaying area 53, is provided a scroll bar 65 being vertically movable. In a case the frame number of the reduced images is five or more, the reduced images of the fifth and succeeding frames are displayed by vertically sliding the scroll bar 65.

Among the reduced images 60 to 63 displayed within the reduced-image displaying area 53, the unchecked reduced images (the reduced images 62 and 63 of the right side in FIG. 2) are displayed in black and while. The image data of the JPEG format used as the reduced image has small bits of 8 bits for the respective colors, and a number of displayable colors is small in comparison with the image 51 to be checked. Thus, the display color of the reduced images 60 to 63 is different from that of the image 51, and an operator observing the reduced image is likely to have mistaken color recognition regarding the image 51. In view of this, the unchecked reduced images are displayed in black and white. Incidentally, the checked reduced image (the second reduced image 61 from the left side) and the out-of-checking reduced image (the leftmost reduced image 60) are displayed in full color.

The parameter adjusting area 54 displays two-type pictures of "Processing-Condition Adjustment" and "Image Adjustment", in the former of which parameters (processing parameters) of processing time are changed and in the latter of which parameters (adjusting parameters) of image-adjusting time are changed. By selecting a tab 70 displayed at an upper portion, the respective pictures for adjustment are switched.

Upon selecting the tab of "Processing-Condition Adjustment", a processing-condition changing picture 71 shown in FIG. 2 is displayed. This picture 71, for example, displays a tone-curve correcting zone 72, a white-balance correcting zone 73, an exposure correcting box 74 and a sensitization correcting box 75. It is possible to change the respective processing parameters by handling the mouse 33 to move the cursor 47 to the target portion and by performing a click operation and a drag operation. After changing the processing parameters, the provisional processing is performed on the basis of the changed processing parameters, and a simple display image newly produced is displayed as the image 51 to be checked.

Upon selecting the tab of "Image Adjustment", an image adjusting picture 80 shown in FIG. 3 is displayed so as to be capable of changing adjustment parameters of color balance, brightness and contrast. Values of the respective adjustment parameters are directly inputted into input boxes 81, which are displayed so as to correspond to the respective adjustment parameters. In another way, it is possible to change the adjustment parameter by horizontally moving an indicator 82. After changing the respective adjustment parameters, image correction is performed for the processed image data corresponding to the image 51, and the corrected image is updated and is displayed within the check-image displaying area 52.

Incidentally, the processing parameters are not limited to the parameters of the tone curve and the white balance shown in FIG. 2. For instance, a parameter of sharpness correction may be included. Moreover, as to the adjustment parameter, a parameter of trimming correction may be included besides the parameters shown in FIG. 3. Further, combinations of the processing parameters and the adjustment parameters are not limited to the present embodiment, but may be properly determined. For instance, the parameter of the color-balance correction may be included as the processing parameter.

A procedure for checking the image is described below with a flowchart shown in FIG. 6. The image pickup conditions of the electronic camera 10 are set by operating the image checking PC or the externally connected PC (S11). On the basis of the set image pickup conditions, shooting is performed by the electronic camera 10, and the raw image data is produced (S12). The raw image data is transferred together with the reduced-image data from the electronic camera 10 to the image checking PC 30 via the communication cable 11 (S13).

On the basis of the reduced-image data, the image checking PC 30 displays the list of the captured images within the reduced-image displaying area 53. At this time, the reduced images are displayed in black and white except for the checked image and the out-of-checking image so that the operator observing the reduced image is prevented from mistakenly recognizing the color.

Regarding the image frame selected by the operator, the process for producing the simple raw image data is performed such that the corresponding raw image data is thinned at the thinning rate correlating with the shooting scene (see FIG. 4). By this process, the simple raw image data is produced (S14). The provisional processing is performed with the initial processing parameters (S15). The simple display image produced by the provisional processing is displayed within the check-image displaying area 52 as the image 51 to be checked (S16).

The operator observes the image 51 to change the processing parameters of the tone curve and color temperature (S17). After changing the processing parameters, the provisional processing is performed again for the simple raw image data with the changed processing parameters. And then, the image 51 to be checked is updated and displayed. In other words, the steps S15 and S16 in FIG. 6 are repeated whenever the processing parameters are changed.

The provisional processing uses the simple raw image data produced by thinning the raw image data in the state that the thinning rates of the respective areas are different in accordance with the shooting scenes. The thinning rate is determined such that the information of the area hardly used for checking is thinned at the high thinning rate and the information of the necessary area is maintained as much as possible. Thus, it is possible to reduce the data size to be dealt with and it is possible to shorten the period to be required for the provisional processing. In addition, it is possible to maintain the information necessary for checking and it is possible to perform the proper checking. Further, since the shooting scene is judged on the basis of the reduced-image data, it is possible to shorten the period to be required for judging the shooting scene.

The simple raw image data is different from the image data compressed in the JPEG format and has the same bits with the raw image data. Thus, the display color is identical. Consequently, it is possible to efficiently shorten the period to be required for the processing without debasing the quality of the display image. When the image having a finish desired by the operator has been obtained, correction of the processing conditions is completed and the processing parameters are determined (S18).

After determining the processing parameters, the picture 50 for checking displays the simple display image as the image 51 to be checked (S19). For this simple display image, the provisional processing has been performed with the determined processing parameters. Additionally, for the simple display image, the processes of the color balance, the contrast, the trimming and so forth have been performed with the initial adjustment parameters. The operator observes the image 51 to change the adjustment parameters (S20). After changing the adjustment parameters, image adjustment (provisional adjustment) of color adjustment, trimming and so forth is performed for the simple display image obtained from the simple raw image data. And then, the image 51 is updated and displayed.

Also in the image adjusting process, the simple raw image data is used. Thus, the processing period is shortened by thinning the information of the area hardly used for checking. Nevertheless, since the information of the area necessary for checking is maintained, it is possible to perform proper checking. Further, since the processing is not performed at the time of changing the adjustment parameter, a period to be required for updating the display is shortened. When the image having a finish desired by the operator has been obtained by repeating the provisional adjustment, the image adjustment is completed and the adjustment parameters are determined (S21).

While the operation for changing the adjustment parameters is performed, processing of the raw image data is performed in the background on the basis of the determined processing parameters (S22) and the processed image data is produced (S23). It is unnecessary to perform the processing of the raw image data after completing the image adjustment so that it is possible to shorten the period to be required for the checking operation. After the image adjustment has been completed, image adjustment (regular adjustment) of color adjustment and trimming is performed for the processed image data on the basis of the determined adjustment parameters (S24). The processed image data obtained after this adjustment is outputted as the checked image data.

In the above embodiment, image checking is performed for the image data of one frame. However, image checking may be performed for plural frames. Meanwhile, when pictures of plural frames are taken under similar composition and similar image pickup conditions, the processing parameters and the adjustment parameters necessary for obtaining a finish desired by the operator are fairly constant. Thus, the period to be required for image checking may be further shortened by omitting the procedures of the provisional processing and the provisional adjustment.

Figure 6:
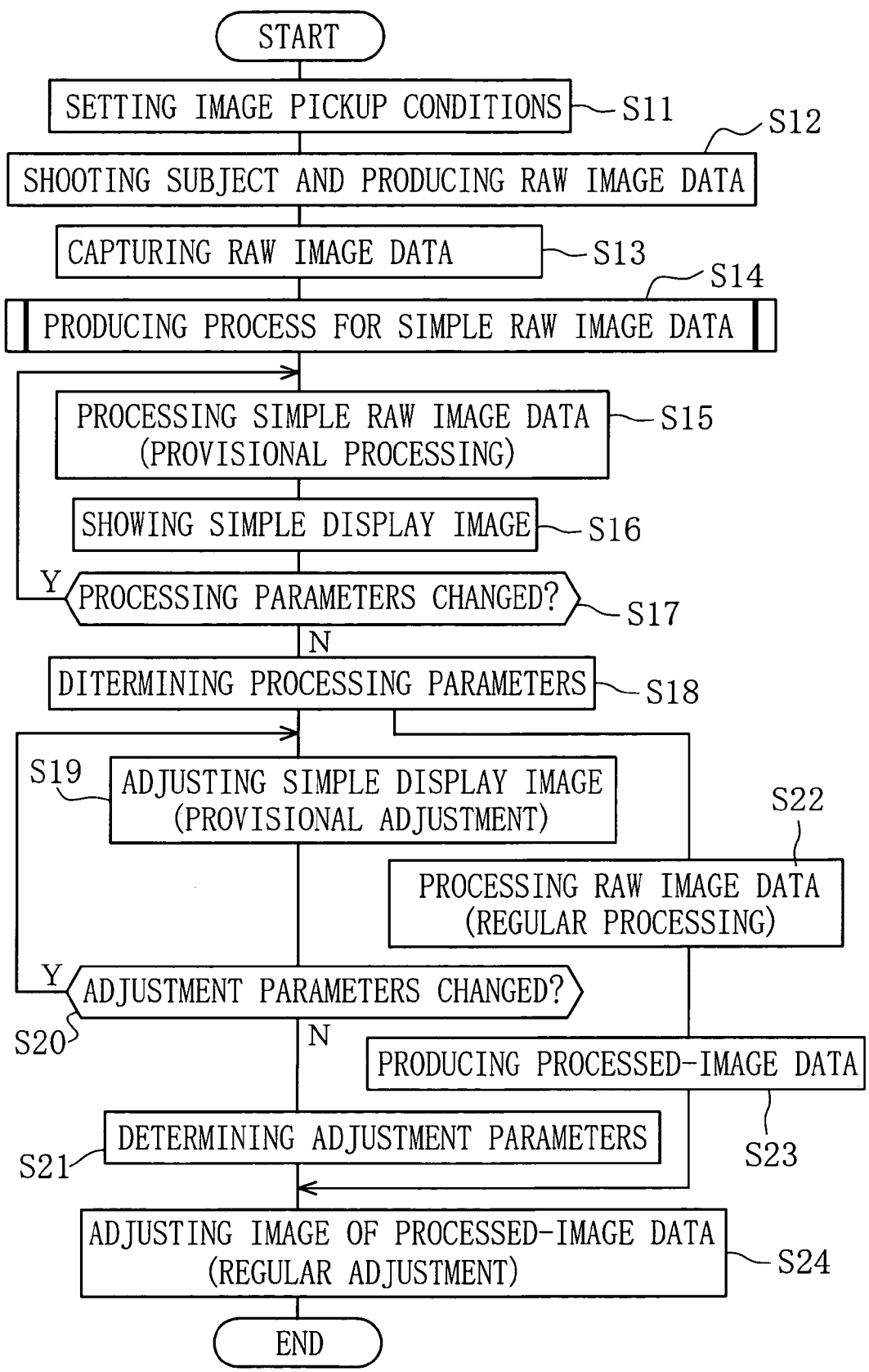
FIG. 6 is a flowchart showing a sequence for checking an image by using the simple raw image data.
Figure 7:
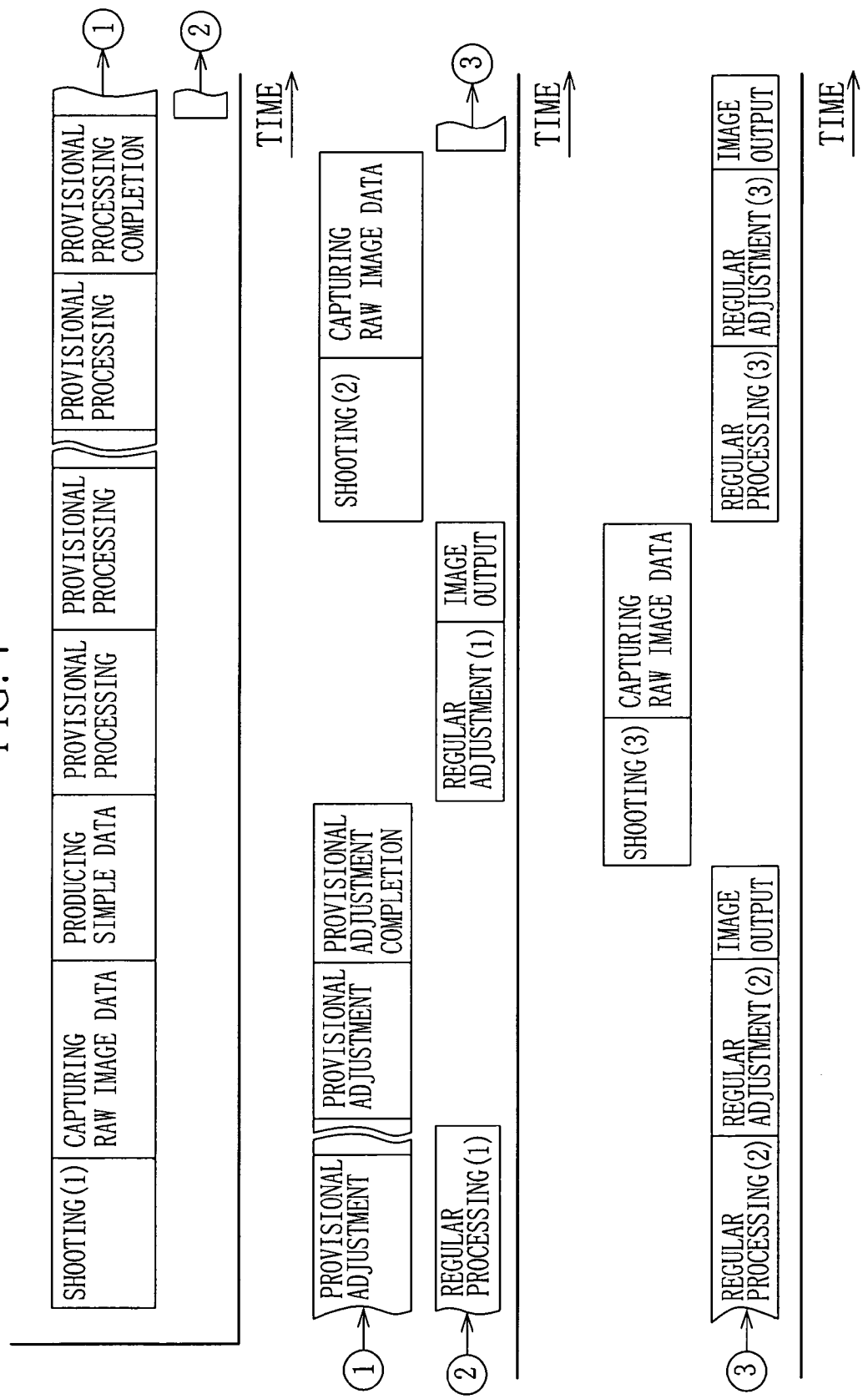
FIG. 7 is a timing diagram showing a checking procedure for a plurality of image frames.

For example, such as shown by a timing chart of FIG. 7, provisional processing and provisional adjustment are repeated for an image of a first frame to determine the processing parameters and the adjustment parameters, similarly to the procedure described along the flowchart of FIG. 6. Successively, an image of a second frame is captured and corresponding raw image data is outputted to the image checking PC 30. And then, the processing and the image adjustment are performed for the raw image data of the second frame by using the processing parameters and the adjustment parameters determined at the time of image checking for the first frame. With respect to third and succeeding images, the processing and the image adjustment are similarly performed. In this way, it is possible to automatically perform the image checking so that the checking operation may be briefly completed. Of course, only the processing may be performed for the raw image data and the image adjustment may be repeated by the operator to determine the adjustment parameters.

Figure 8:
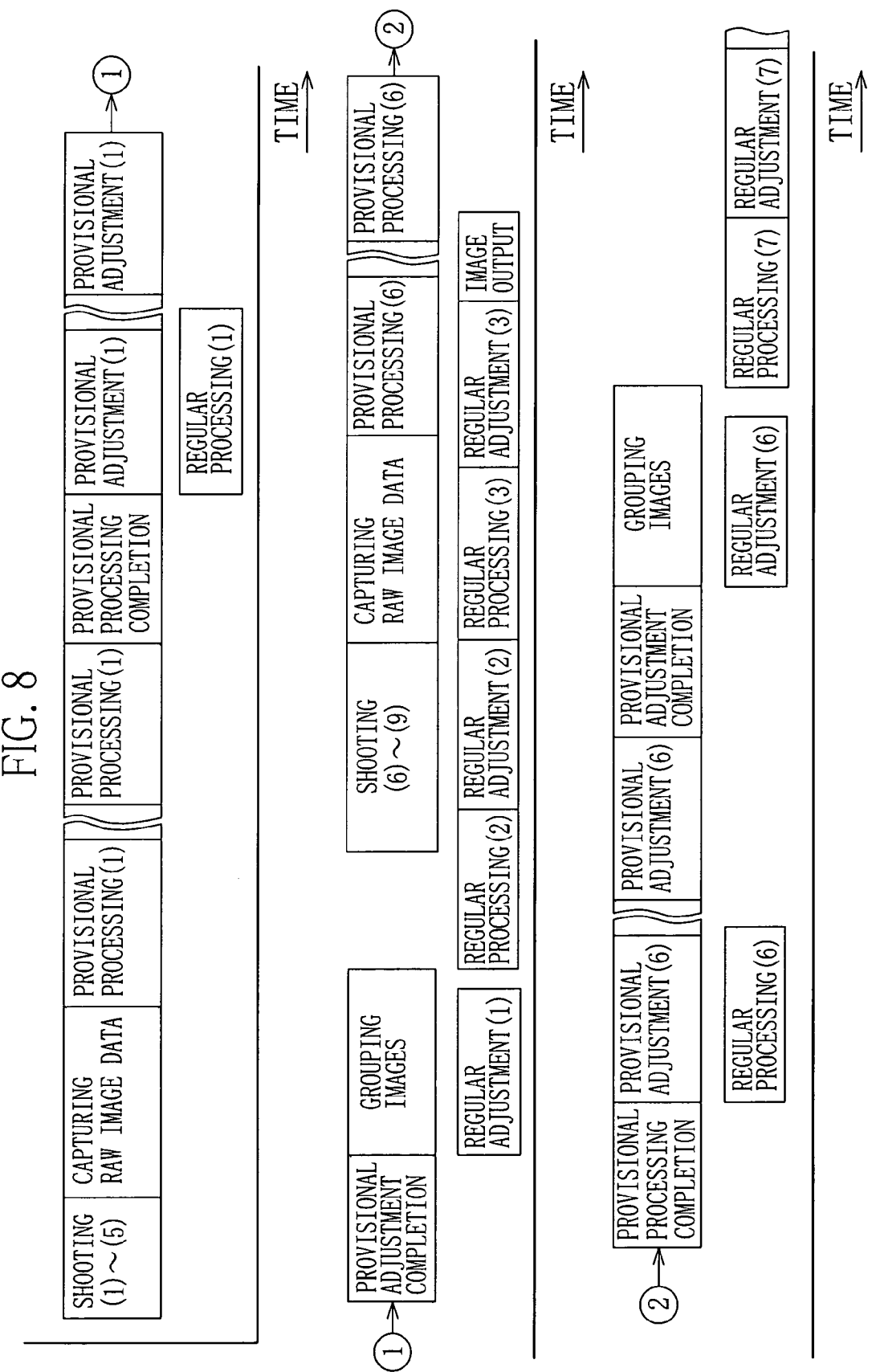
FIG. 8 is a timing diagram showing another embodiment of the checking procedure.

FIG. 8 shows a timing chart in which shooting is repeated by plural times to output raw image data of plural frames (five frames in an example of FIG. 8). And then, the provisional processing and the provisional adjustment are similarly performed for the image of the first frame to determine the processing parameters and the adjustment parameters. Although illustration is abbreviated in FIG. 8 for the purpose of simplification, the provisional processing and the provisional adjustment are performed by using the simple raw image data, which is produced by thinning the raw image data at a thinning rate determined in accordance with the shooting scene. After completing the provisional adjustment of the first frame, the other image frame to be processed and adjusted is selected by the operator. During this selecting operation, image adjustment is performed for the raw image data of the first frame on the basis of the adjustment parameters.

The operator selects the image frame to be processed under the same conditions with the image of the first frame. For instance, if the images of the second and third frames are grouped, the processing and the image adjustment are performed for the raw image data of the second and third frames by using the processing parameters and the adjustment parameters determined at the time of checking the image of the first frame. By the way, only the processing may be performed for the raw image data, and the operator may repeat the image adjustment to determine the adjustment parameters.

While the processing and the image adjustment are performed for the second and succeeding frames, it is possible to take the next subject. For instance, images of sixth to twelfth frames are captured to output the raw image data thereof to the image checking PC 30, wherein the thinning process is performed for the raw image data of the sixth frame to produce the simple raw image data. Similarly to the first frame, the operator performs the checking operation for the image of the sixth frame. After completion of the checking operation, the operator selects the image frame to be processed under the same conditions with the image of the sixth frame. For instance, if the images of the seventh to tenth frames are grouped, the processing and the image adjustment are performed for the raw image data of the seventh to tenth frames by using the processing parameters and the adjustment parameters determined at the time of image checking of the sixth frame. Of course, only the processing may be performed for the raw image data, and the operator may repeat the image adjustment to determine the adjustment parameters.

Incidentally, two modes may be provided so as to be changeable in accordance with the image pickup conditions. In one of the modes, the image processing is performed along the sequence shown by the timing chart of FIG. 7. In the other of the modes, the image processing is performed along the sequence shown by the timing chart of FIG. 8. For example, when pictures are taken in a studio, the image pickup conditions are constant. In this case, by performing the image processing along the sequence shown in FIG. 7, it is possible to automatically perform the image processing whenever shooting is carried out. By contrast, when the image pickup conditions are inconstant, the mode is changed to the sequence shown in FIG. 8. The image processing is performed in a lump for only the necessary image frames and is omitted for the unnecessary image frames. Thus, the image processing is efficiently performed.

In the above embodiment, the simple raw image data is produced in the image checking PC 30. However, the raw image data may be thinned in the electronic camera 10 to produce the simple raw image data, and this simple raw image data may be outputted to the image checking PC 30 together with the raw image data. Moreover, in the above embodiment, the store-bought personal computer is used as the image checking PC 30. However, the image processing may be performed by an exclusive device for checking the image. In this case, the exclusive device is provided with a simple raw image data producer, a processor, an image corrector and so force. The simple raw image data producer produces the simple raw image data by thinning the raw image data at the thinning rate determined in accordance with the shooting scene. The processor performs the provisional processing and the regular processing. The image corrector enables the correction parameters to be adjusted for the simple raw image data, and performs image correction for the raw image data on the basis of the determined correction parameters.

Figure 9:
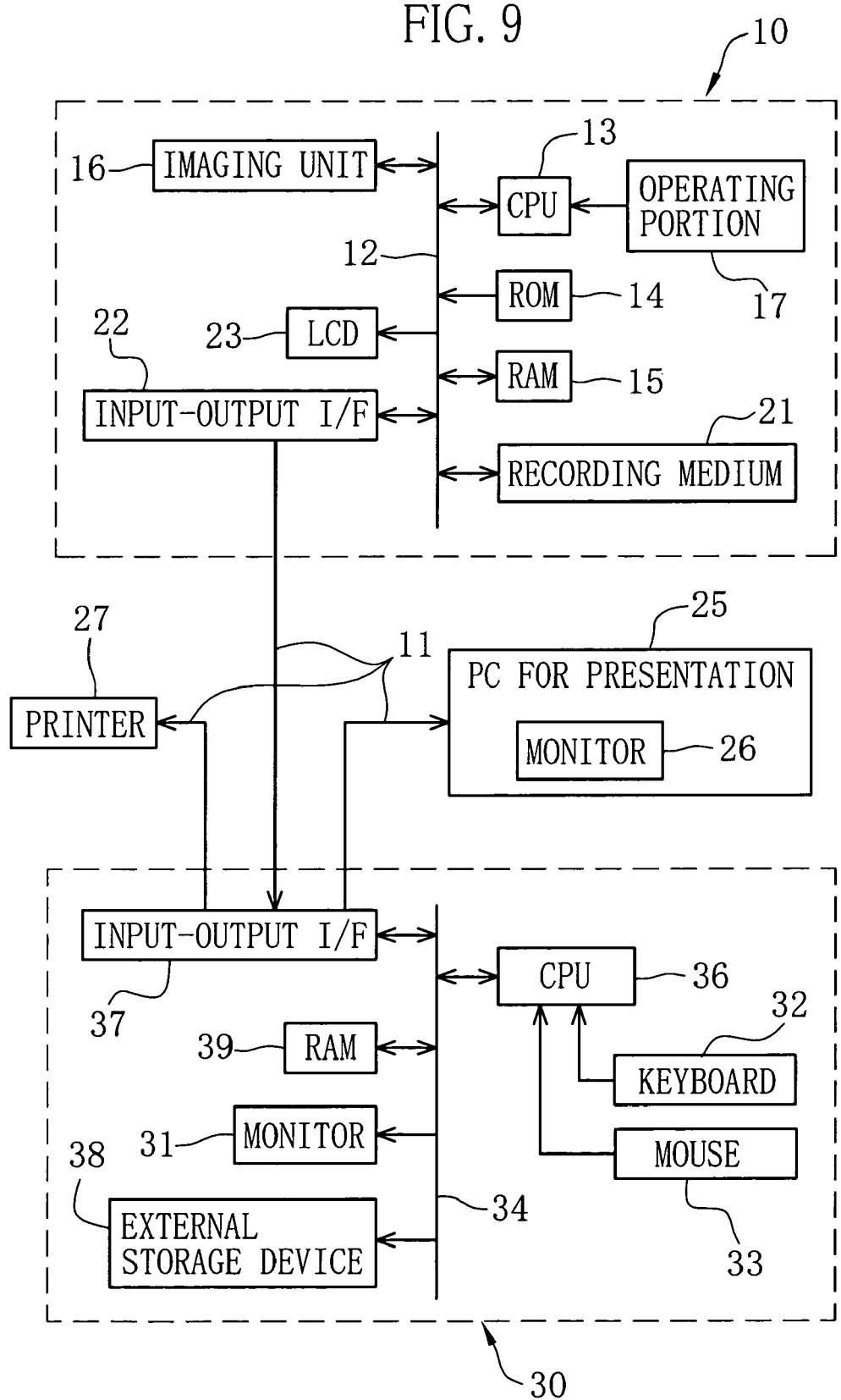
FIG. 9 is a block diagram schematically showing a structure of the electronic camera and the image checking PC of another embodiment.

Next, another embodiment of the present invention is described below. In this embodiment, a component being identical with that of the forgoing embodiment is denoted by the same reference numeral, and description thereof is abbreviated. FIG. 9 is a block diagram showing an imaging system constituted of an electronic camera 10, an image checking PC 30, a PC 25 for presentation (hereinafter, presentation PC 25) and a printer 27. It is possible to use a store-bought personal computer as the image checking PC 30 and the presentation PC 25. As to the printer 27, it is possible to use various printers of an ink-jet printer, a laser printer and so forth, which are well known.

The presentation PC 25 is used for making a customer (user) of a photo studio confirm an approximate finish state of a digital image obtained by shooting. Further, the presentation PC 21 is used for receiving a print order. Meanwhile, the image checking PC 30 is used for a staff (operator) of the photo studio to perform various correction processes for the digital data obtained by shooting. The image checking PC 30 is also used for printing the corrected image. An image processing program and a printer driver for driving the printer 27 are installed in the image checking PC 30. The printer 27 is controlled by the image checking PC 30 to print the image based on the image data, which is transferred from the image checking PC 30, on a photographic recording paper, for instance.

The electronic camera 10 and the image checking PC 30 are connected to each other via a communication cable 11. Further, the image checking PC 30 and both of the presentation PC 25 and the printer 27 are connected to each other via the communication cables 11. Thus, the control data and the image data are adapted to be transferred and received.

On the basis of the raw image data transferred from the electronic camera 10, the image checking PC 30 reproduces the image on a monitor 31. In addition, the image checking PC 30 performs the various image corrections in response to operational signals sent from input devices of a keyboard 32, a mouse 33 and so forth. The respective sections of the image checking PC 30 are connected with each other via a data bus 34, and operations thereof are integrally controlled by the CPU 36. The raw image data transferred from the electronic camera 10 is recorded in an external storage device 38 of a hard disk and so forth via an input-output I/F 37 and the data bus 34. The input devices of the keyboard 32 and the mouse 33 are operated when the image pickup conditions of the electronic camera 10 are set and when checking and presentation described later are performed.

Figure 10:
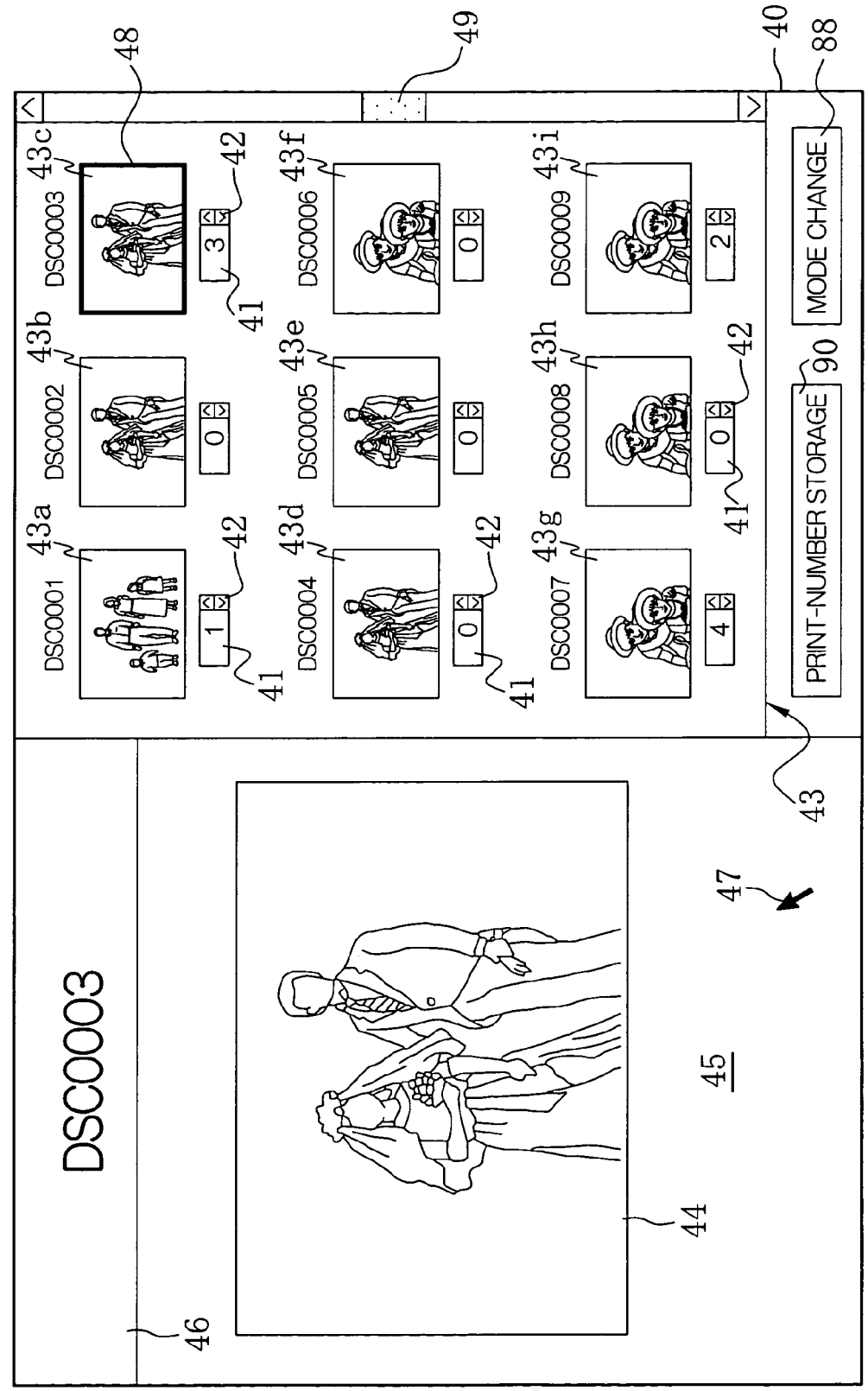
FIG. 10 is an explanatory illustration showing a presentation picture.

The image processing program is provided with a presentation mode and a checking mode. Under the presentation mode, a picture 40 for presentation shown in FIG. 10 is displayed on the monitors 31 and 26 of the image checking PC 30 and the presentation PC 25. Under the checking mode, the picture 50 for checking shown in FIGS. 2 and 3 is displayed on the monitor 31 of the image checking PC 30.

On the respective pictures 40 and 50, a click operation and a drag operation are performed by handling the keyboard 32 and by moving a cursor 47 with the mouse 33. Under the presentation mode, the print order is received after the user has confirmed the approximate finish state of the taken image. Under the checking mode, the operator performs the checking operation to correct the taken image. Changing the modes is performed upon selecting a tab 88 of "Mode Change" displayed at a right-lower region of the respective pictures 40 and 50.

When the presentation mode has been selected, a presentation-image displaying area 45 and a thumbnail-image displaying area 43 are set up on the picture 40 for representation (see FIG. 10). The presentation-image displaying area 45 displays a representation image 44, and the thumbnail-image displaying area 43 displays a plurality of thumbnail images 43a to 43i. Further, a title bar 46 is displayed at an upper side of the presentation-image displaying area 45 to indicate a title (filename) of the presentation image 44.

The presentation image 44 and the thumbnail images 43a to 43i are based on simple raw image data, which is produced by a producing process thereof (see FIG. 11) so as to thin the raw image data. This producing process is described later. Image correction is carried out for the simple raw image data with initial parameters preset in the image processing program. Further, the simple raw image data is converted into Tiff format having 16-bit gradation value, for example, and is outputted to the monitors 26 and 31 as simple processed image data. Thereupon, the presentation image 44 is displayed within the presentation-image displaying area 45, and the thumbnail images 43a to 43i are displayed within the thumbnail-image displaying area 43. Similarly to the forgoing embodiment, processing for performing the image correction of the simple raw image data and outputting the simple processed image data is called as "provisional processing". Further, processing for performing the image correction of the raw image data and outputting the processed image data is called as "regular processing".

A selection cursor 48 is highlighted at the surrounding portion of the thumbnail image 43c corresponding to the presentation image 44 to relate the thumbnail image 43c to the presentation image 44. At the right side of the thumbnail-image displaying area 43, is provided a scroll bar 49 being vertically movable. In a case the frame number of the thumbnail images is more than nine, the thumbnail images of the tenth and succeeding frames are displayed by vertically sliding the scroll bar 49. Incidentally, although the thumbnail images of nine frames are displayed in FIG. 2, the frame number to be simultaneously displayed may be properly increased and decreased.

Input boxes 41 for inputting a print-ordered number are displayed under the respective thumbnail images 43a to 43i. The print-ordered number is inputted by directly inputting a value into the input box 41 or by clicking an up-and-down button 42. After inputting the print number of the desired image, a tab 90 of "Print-Number Storage" provided under the thumbnail-image displaying area 43 is selected. Upon this, the image processing program stores the print number, which is inputted into the input box 41, so as to relate to the corresponding raw image data.

In the meantime, when the checking mode has been selected, a check-image displaying area 52, a thumbnail-image displaying area 53 and a parameter adjusting area 54 are set up on the picture 50 for checking (see FIGS. 2 and 3). The check-image displaying area 52 displays an image 51 to be checked. The thumbnail-image displaying area 53 displays a plurality of thumbnail images 60 to 63, namely reduced images 60 to 63, side by side. Further, a title bar 56 displaying a title (file name) of the image 51 is displayed at an upper side of the check-image displaying area 52.

Similarly to the presentation image 44 and the thumbnail images 43a to 43i (see FIG. 10), the image 51 and the thumbnail images 60 to 63 are also based on the simple raw image data, which is produced by the producing process thereof (see FIG. 11) so as to thin the raw image data. This producing process is described later. The simple raw image data is provisionally processed and is outputted to the monitor 31 as the simple processed image data. Thereupon, the image 51 to be checked is displayed within the check-image displaying area 52, and the thumbnail images 60 to 63 are displayed within the thumbnail-image displaying area 53.

A selection cursor 64 is highlighted at the surrounding portion of the thumbnail image 62 corresponding to the image 51 to relate the thumbnail image 62 to the image 51. At the right side of the thumbnail-image displaying area 53, is provided a scroll bar 65 being vertically movable. In a case the frame number of the thumbnail images is five or more, the thumbnail images of the fifth and succeeding frames are displayed by vertically sliding the scroll bar 65. Incidentally, although the thumbnail images of four frames are displayed in FIGS. 2 and 3, the frame number to be simultaneously displayed may be properly increased and decreased.

After completing the checking operation, a tab 100 of "Print Execution" displayed under the parameter adjusting area 54 is selected. Upon this, is performed print processing in which the regular processing is performed for the raw image data of the ordered image by using the changed processing parameters and the changed adjustment parameters, which are determined under the checking mode, to produce the processed image data. This processed image data is outputted to the printer 27 via the input-output I/F 37. The printer 27 prints the image based on the processed image data having been inputted.

The simple raw image data is used at the time of checking and presentation. The simple raw image data is produced by thinning the raw image data and has a small data size. In virtue of this, it is possible to shorten a period necessary for the operations of the checking and the presentation. However, the checking operation is performed to determine a mood and an impression of the image. If the raw image data is remarkably thinned more than necessary, it becomes difficult to grasp the image of the raw image data so that the exact image correction is likely to be disturbed. Meanwhile, the presentation is performed to confirm the approximate finish state at the time of print order. Thus, it is required to smoothly conduct the presentation by using the simple raw image data produced by remarkably thinning the raw image data. In view of the above, in this embodiment, the thinning rate for thinning the raw image data is adapted to be changed in accordance with the uses of the simple display image.

The producing process for producing the simple raw image data by thinning the raw image data is described below with a flowchart shown in FIG. 11. The image processing program is executed, and then, the use of the simple display image based on the simple raw image data is judged (S31). In other words, it is judged whether the simple display image is going to be displayed as the image to be checked or the presentation image or the thumbnail image.

Figures 11, 12:
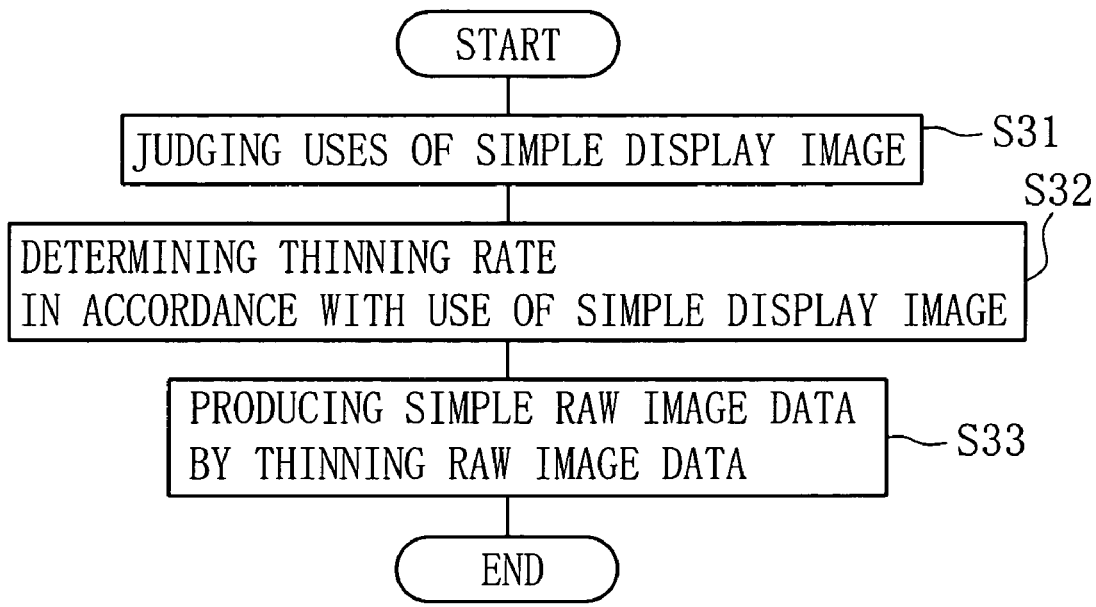
FIG. 11 is a flowchart showing a sequence for producing simple raw image data.
FIG. 12 is an explanatory illustration showing a relationship between thinning rates and uses of simple raw image data.

The image processing program is provided with a data table 116 shown in FIG. 12, in which the use of the simple display image is related to the thinning rate. On the basis of this data table 116, the thinning rate is determined. In the data table 116, there are three thinning rates of a small thinning rate, a middle thinning rate and a large thinning rate. As to the small thinning rate, numbers of vertical and horizontal pixels constituting the simple raw image data respectively become about one-third (vertical 946 pixels and horizontal 1419 pixels in this embodiment) relative to numbers of vertical and horizontal pixels constituting the raw image data (vertical 2848 pixels and horizontal 4256 pixels in this embodiment). As to the middle thinning rate, the numbers of the vertical and horizontal pixels constituting the simple raw image data respectively become about one-fifth (vertical 564 pixels and horizontal 846 pixels in this embodiment). As to the large thinning rate, the numbers of the vertical and horizontal pixels constituting the simple raw image data respectively become about one-seventh (vertical 402 pixels and horizontal 603 pixels in this embodiment).

The small thinning rate is selected when the use of the simple display image has been judged as the image 51 to be checked. Similarly, the middle thinning rate is selected when the use of the simple display image has been judged as the presentation image 44, and the large thinning rate is selected when the use of the simple display image has been judged as the thumbnail images 43a to 43i and 60 to 63 (S32). By thinning the raw image data at the selected thinning rate, the simple raw image data is produced so as to have a data size correlating with the use (S33). By the way, in this embodiment, three thinning rates correlating with three uses are set. However, it is possible to properly change the number and sorts of the uses and the thinning rates correlating therewith.

The respective simple image data produced in this way and having three different data sizes were provisionally processed by the image checking PC. At this time, the image to be checked was displayed at about 5 seconds, the presentation image was displayed at about 2.5 seconds, and the thumbnail images were displayed at about 1.5 seconds. Meanwhile, it took 20 seconds to display the image produced by regularly processing the raw image data. Incidentally, at this time, clock frequency of a CPU of the image checking PC was 2.4 GHZ. Further, in the provisional processing and the regular processing, the image data was converted into the Tiff format having a 16-bit gradation value and was outputted to the monitor.

Figure 13:
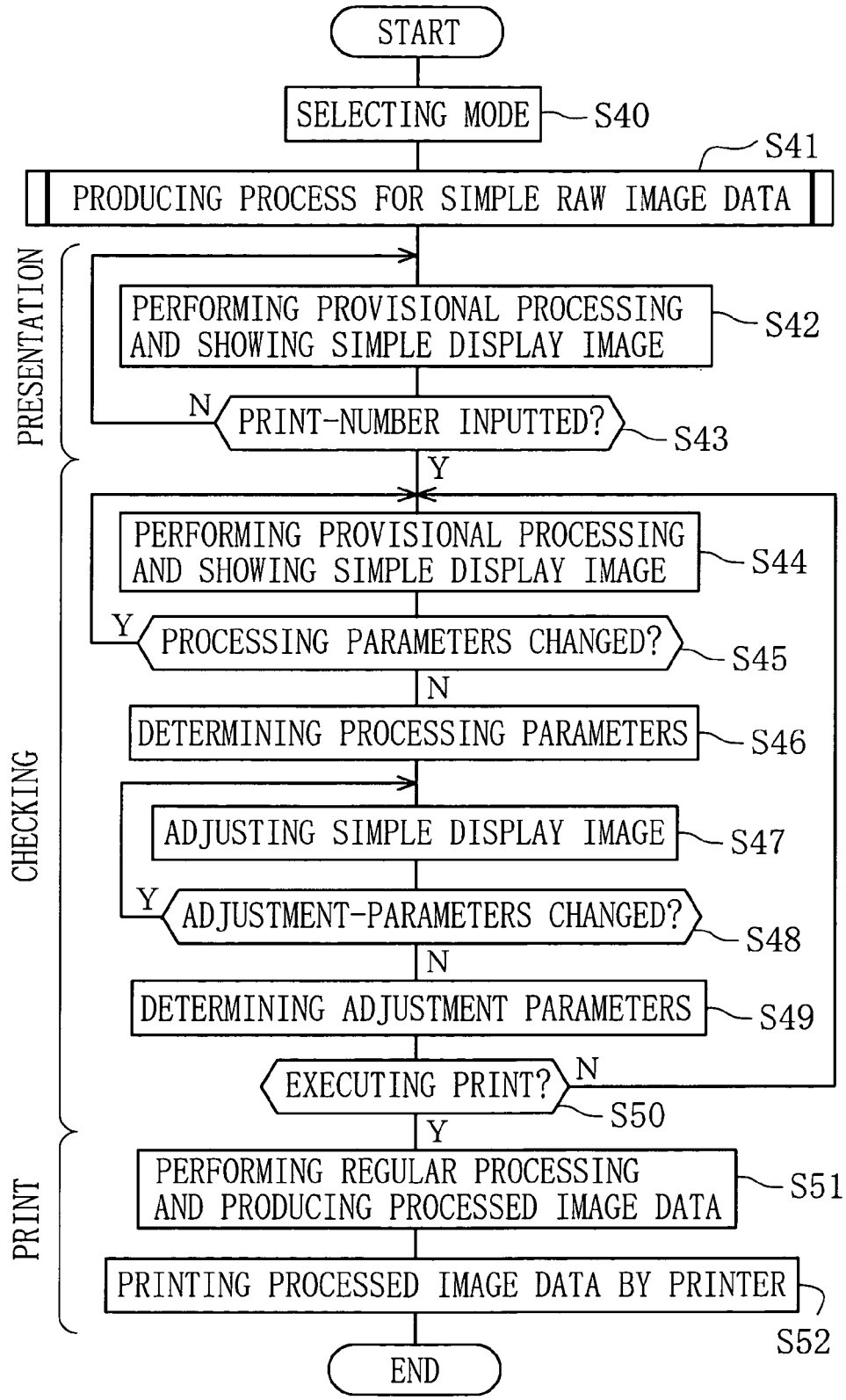
FIG. 13 is a flowchart showing a sequence of checking and presentation using the simple raw image data.

A sequence of the presentation and the checking is described below with a flowchart shown in FIG. 13. Image pickup conditions of the electronic camera 10 are set by operating the image checking PC 30 or an externally connected PC. On the basis of the set conditions, shooting is performed with the electronic camera 10 to produce the raw image data, which is transferred from the electronic camera 10 to the image checking PC 30 via the communication cable 11.

It is possible in the image checking PC 30 to select either of the presentation mode and the checking mode (S40). Under the presentation mode, the presentation image 44 and the thumbnail images 43a to 43i (see FIG. 10) are viewed and the print order is receivable. Under the checking mode, the image 51 and the thumbnail images 60 to 63 displayed on the picture 50 (see FIGS. 2 and 3) are viewed and the taken image is corrected.

Upon selection of the mode, the producing process for the simple raw image data (see FIG. 11) is performed to produce the simple raw image data by thinning the raw image data (S41). When the simple raw image data is produced, the thinning rate is determined in accordance with the use of the simple display image based on the simple image data. By thinning the raw image data at the small rate, the simple raw image data to be displayed as the check image 51 is produced. Meanwhile, by thinning the raw image data at the middle rate, the simple raw image data to be display as the presentation image 44 is produced. Further, by thinning the raw image data at the large rate, the simple raw image data to be displayed as the thumbnail images 43a to 43i and 60 to 63 are produced.

Under the presentation mode, the image checking PC 30 performs the provisional processing for the simple raw image data with the initial parameters, and the simple display images produced by the provisional processing are displayed on the picture 40 as the presentation image 44 and the thumbnail images 43a to 43i (S42). The user confirms the approximate finish state of the taken image by observing the picture 40, and then, the user inputs the print number of the desired image to place the print order (S43). In case the user feels dissatisfaction for the finish state, the user can ask the operator to correct the image so as to make the image brighter by a little, for instance.

The operator can correct the taken image under the checking mode. In this checking mode, the image checking PC 30 performs the provisional processing for the simple raw image data with the initial processing parameters to display the produced simple display image within the check-image displaying area 52 as the image 51 to be checked (S44). The operator observes the image 51 to change the processing parameters of the tone curve, the color temperature and so forth (S45). After the processing parameters have been changed, the provisional processing is performed again for the simple raw image data with the changed processing parameters to update the display of the image 51 to be checked. When the image having a finish desired by the operator has been obtained, correction of the processing conditions is completed and the processing parameters are determined (S46).

After determination of the processing parameters, the provisional processing is performed for the simple display image with the determined processing parameters. The processed simple display image, for which the processes of color balance, contrast, trimming and so forth have been preformed with the initial adjustment parameters, is displayed on the picture 50 as the image 51 to be checked (S47). The operator observes this image 51 to change the adjustment parameter (S48). After changing the adjustment parameter, image adjustment of color adjustment, trimming and so forth are performed for the simple display image obtained from the simple raw image data. And then, the display of the image 51 is updated. When the image having a finish desired by the operator has been obtained by repeating the above adjustment, the image adjustment is completed and the adjustment parameters are determined (S49).

After the checking has been completed, the tab 100 of "Print Execution" is selected (S50). Upon this, the regular processing is performed for the raw image data of the ordered image with the changed parameters to produce the processed image data (S51). This processed image data is outputted to the printer 27 via the input-output I/F 37 to print the image (S52).

In this way, the checking and the presentation are performed by using the simple display image based on the simple raw image data, which is produced by thinning the raw image data. Thus, the size of the data to be treated is reduced so that it is possible to shorten the period to be required for the checking and the presentation. Moreover, the thinning rate of the raw image data is changed in accordance with the uses of the simple display image. The thinning rate is small when the simple display image is displayed as the image to be checked. The thinning rate is middle when the simple display image is displayed as the presentation image. The thinning rate is large when the simple display image is displayed as the thumbnail image. Thus, it is possible to perform proper checking at the time of the checking operation, keeping image quality being necessary for checking. Moreover, at the time of the presentation, it is possible to immediately display the presentation image so that the presentation is smoothly conducted. Further, since the thumbnail image is produced by thinning the raw image data at the largest thinning rate, it is possible to smoothly perform the checking and the presentation.

In the above embodiment, the simple raw image data is produced in the image checking PC. However, the simple raw image data may be produced by thinning the raw image data in the electronic camera and the presentation PC. Meanwhile, it is possible to freely set the timing for producing the simple raw image data. For instance, the simple raw image data may be produced just after producing the raw image data. In this case, plural kinds of the simple raw image data, which are produced by thinning the raw image data at different thinning rates and have different data sizes, are prepared in advance before commencing the checking and the presentation. When the checking and the presentation are performed, the simple raw image data having the data size suitable for the use is selected from among the prepared simple raw image data. By doing so, it is possible to smoothly perform the checking and the presentation.

In the above embodiment, the printer prints the image obtained by performing the regular processing for the raw image data. However, if resolution of the printer is low relative to the size of the raw image data, the image is likely to extend beyond a print area of a recording paper. In such a case, the printer may print the image obtained by performing the provisional processing for the simple raw image data.

In this case, such as shown in FIG. 14 for example, a printer driver installed in the checking PC is accessed in the producing process for the simple raw image data to detect the resolution of the printer (S61). The thinning rate is determined in accordance with the resolution of the printer such that the image appropriately falls within the print area of the recording paper (S62). The simple raw image data is produced by thinning the raw image data at the determined thinning rate (S63).

Similarly, if resolution of the monitor for displaying the simple display images of the image to be checked, the presentation image and so forth is low relative to the size of the raw image data, the simple display image is likely to extend beyond a display area of the monitor. In this case, such as shown in FIG. 15, a monitor driver installed in the checking PC and an OS (Operating System) thereof is accessed in the producing process for the simple raw image data to detect the resolution of the monitor (S71). The thinning rate is determined in accordance with the resolution of the monitor such that the simple display image appropriately falls within the display area of the monitor (S72). The simple raw image data is produced by thinning the raw image at the determined thinning rate (S73).

In the meantime, if the thinning rate for producing the simple raw image data is small relative to the size of the raw image data despite the fact that the apparatus for performing the checking and the presentation has low image-processing ability, it is impossible to smoothly perform the checking and the presentation. Further, if the thinning rate for producing the simple raw image data is large relative to the size of the raw image data despite the fact that the apparatus for performing the checking and the presentation has high image-processing ability, it is likely to prevent the apparatus from exercising the image-processing ability.

In this case, such as shown in FIG. 16, an OS (Operating System) of the apparatus for performing the checking and the presentation is accessed in the producing process for the simple raw image data to detect the image-processing ability, which is a clock frequency of a CPU for instance (S81). The thinning rate is determined in accordance with the image-processing ability such that the thinning rate is small in the case of the high image-processing ability and the thinning rate is large in the case of the low image-processing ability (S82). The simple raw image data is produced by thinning the raw image data at the determined thinning rate (S83).

In this way, according to the present invention, it is possible to change the thinning rate in accordance with the various factors when the simple raw image data is produced. The various factors include the uses, the resolution of the printer and the monitor, and the image-processing ability of the apparatus for performing the checking and the presentation. It is also possible to change the thinning rate on the basis of the other factors. Further, the thinning rate may be changed by comprehensively judging the plural factors. In this case, such as shown in FIG. 17, a reference thinning rate is determined in accordance with the use of the simple display image in the producing process for the simple raw image data (S91). Successively, a correction coefficient is calculated in accordance with the monitor size and the image-processing ability of the apparatus for performing the checking and the presentation (S92). A final thinning rate is determined by multiplying the reference thinning rate and the correction coefficient (S93). The simple raw image data is produced by thinning the raw image data at the determined thinning rate (S94).

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image processing method for performing image correction for raw image data of an image taken by an electronic camera, said image processing method comprising the steps of:
   determining a thinning rate, which is for thinning said raw image data, regarding at least one of areas of said image on the basis of a shooting scene;
   producing simple raw image data by thinning said raw image data at said thinning rate;
   performing image correction for said simple raw image data with a first correction parameter;
   showing a simple display image based on the corrected simple raw image data;
   adjusting said first correction parameter as need arises after observation of said simple display image; and
   performing image correction for said raw image data on the basis of the adjusted first correction parameter.

2. An image processing method according to claim 1, wherein said thinning rate is determined for the respective areas of said image.

3. An image processing method according to claim 2, wherein said image includes the first area of a high thinning rate and the second area of a low thinning rate, and a pixel density of said first area is conformed to that of said second area by interpolating with pixel data of the thinned first area.

4. An image processing method according to claim 1, wherein said thinning rate is determined on the basis of a reduced image corresponding to said raw image data, said reduced image being obtained by reducing a size of said image in the electronic camera.

5. An image processing method according to claim 4, wherein said reduced image corresponding to the image, for which the image correction has not yet been performed, is displayed in black and white.

6. An image processing method according to claim 1, wherein whenever said first correction parameter is changed, the image correction is performed for said simple raw image data with the changed first correction parameter to display the corrected simple raw image data.

7. An image processing method according to claim 1, wherein said simple display image is adjusted with a second correction parameter after adjusting said first correction parameter, and image adjustment of said raw image data is performed with the determined second correction parameter.

8. An image processing method according to claim 1, wherein said simple raw image data corresponding to the first-frame image is adjusted with said first correction parameter, and image correction is performed for the raw image data corresponding to the images of second and succeeding frames with the determined first correction parameter.

9. An image processing method according to claim 1, wherein said simple raw image data is produced for one of the images to adjust said first correction parameter, and the image correction is performed for the raw image data, which corresponds to the selected other image of said images, with the determined fist correction parameter.

10. An image processing method according to claim 1, wherein a first processing mode and a second processing mode are selectable,
    said first processing mode producing said simple raw image data for the first-frame image to adjust said first correction parameter, and performing the image correction for the raw image data corresponding to the images of second and succeeding frames with the determined first correction parameter, and
    said second processing mode producing said simple raw image data for one of the images to adjust said first correction parameter, and performing the image correction for the raw image data, which corresponds to the selected other image of said images, with the determined fist correction parameter.

11. An image processing system comprising:
    an electronic camera for producing raw image data by shooting a subject; and
    an image converting device for performing image correction for said raw image data,
    wherein simple raw image data is produced by thinning said raw image data at a thinning rate, which is changed in accordance with a shooting scene, in either of said electronic camera and said image converting device,
    in said image converting device, image correction is performed for said simple raw image data with a first correction parameter, and a simple display image is shown on the basis of the corrected simple raw image data to make said first parameter adjustable, and then, the image correction is performed for said raw image data on the basis of the adjusted first correction parameter.

12. An image processing system according to claim 11, wherein said thinning rate is changed in accordance with the shooting scenes of person, scenery and building.

13. An image processing apparatus comprising:
    a data producer for producing simple raw image data by thinning raw image data, which is taken by shooting, at a thinning rate corresponding to a shooting scene;
    a first image corrector for performing image correction for said simple raw image data with a first correction parameter;
    a display for showing a simple display image based on the corrected simple raw image data;
    an adjuster for making said first correction parameter adjustable in order to correct the simple display image of said display; and
    a second image corrector for performing image correction for said raw image data on the basis of the adjusted first correction parameter.

14. An image processing apparatus according to claim 13, wherein said thinning rate is changed in accordance with the shooting scenes of person, scenery and building.

* * * * *